US008923460B1

(12) United States Patent
Wang et al.

(10) Patent No.: US 8,923,460 B1
(45) Date of Patent: Dec. 30, 2014

(54) METHODS AND APPARATUS FOR SIGNAL EQUALIZATION IN DUAL POLARIZATION MULTIPLEXED OPTICAL COMMUNICATION SYSTEMS

(71) Applicant: PMC-Sierra US, Inc., Sunnyvale, CA (US)

(72) Inventors: Xiaofeng Wang, Beaconsfield (CA); William D. Warner, Maple Ridge (CA)

(73) Assignee: PMC-Sierra US, Inc., Sunnyvale, CA (US)

( * ) Notice: Subject to any disclaimer, the term of this patent is extended or adjusted under 35 U.S.C. 154(b) by 143 days.

(21) Appl. No.: 13/767,092

(22) Filed: Feb. 14, 2013

(51) Int. Cl.
*H04B 10/25* (2013.01)
*H04B 10/2569* (2013.01)

(52) U.S. Cl.
CPC .................................. *H04B 10/2569* (2013.01)
USPC ........................................................... 375/350

(58) Field of Classification Search
CPC ................................ H04B 10/00; H04B 10/25
USPC ........... 375/350, 254, 285; 398/159, 208, 209
See application file for complete search history.

(56) References Cited

U.S. PATENT DOCUMENTS

| | | | |
|---|---|---|---|
| 2007/0147850 A1* | 6/2007 | Savory et al. | 398/208 |
| 2010/0142952 A1 | 6/2010 | Qian et al. | |
| 2012/0099864 A1* | 4/2012 | Ishihara et al. | 398/65 |
| 2012/0275797 A1* | 11/2012 | Li et al. | 398/152 |
| 2013/0308960 A1* | 11/2013 | Horikoshi et al. | 398/209 |

OTHER PUBLICATIONS

Savory, "Digital filters for coherent optical receivers", Optics Express, Jan. 21, 2008, vol. 16, No. 2, pp. 804-817.
Ip et al., "Fiber Impairment Compensation Using Coherent Detection and Digital Signal Processing", Feb. 3, 2010, Downloaded on Feb. 15, 2010 from IEEE Xplore, pp. 502-519.

* cited by examiner

*Primary Examiner* — Jaison Joseph
(74) *Attorney, Agent, or Firm* — Dennis R. Haszko (57) ABSTRACT

Methods and systems are provided for processing electrical signals derived from coherent dual polarization optical signals. A method comprises receiving first and second input signals, filtering the input signals by first and second complex SISO FIR to generate filtered input signals, filtering the filtered input signals and the input signals by first and second two-by-two matrix filters each having four branches to respectively generate equalized filtered signals and equalized signals, and, adapting the first and second complex SISO FIR filters based on the equalized signals and the equalized filtered signals. Another method comprises filtering two random polarization input signals in a frequency-domain by overlapped FFT/IFFT blocks to generate partially equalized signals, delaying the partially equalized signals to generate delayed partially equalized signals, filtering the delayed partially equalized signals by a two-by-two matrix filter having four branches to generate equalized signals, and, adapting the FFT/IFFT blocks based on the equalized signals.

22 Claims, 5 Drawing Sheets

METHODS AND APPARATUS FOR SIGNAL EQUALIZATION IN DUAL POLARIZATION MULTIPLEXED OPTICAL COMMUNICATION SYSTEMS

FIELD

The present disclosure relates generally to telecommunications, and more particularly to coherent dual polarization optical communication systems.

BACKGROUND

In a communications network such as the Optical Transport Network (OTN) defined in ITU-T Recommendation G.709 (G.709), which is hereby incorporated by reference herein, information is encoded in optical signals for transmission over optical fibers. Receivers are used to sample the optical signals for conversion into electrical signals for extraction and processing of the encoded information.

Light pulses traveling through fibers are subject to a number of adverse effects (often referred to as "impairments"), including chromatic dispersion (CD), polarization-mode dispersion (PMD) and polarization-dependent loss (PDL). CD is the phenomenon that light components of different wavelengths travel at different velocities, leading to the spreading of a pulse as it propagates along the fiber. The time spread due to CD is proportional to the dispersion parameter of the fiber, the bandwidth of the signal, the square of the light wavelength, and the length of the fiber. For high-speed long-haul optical links, the time spread can cover a few tens of to a few hundreds of the original pulse durations. As a result, hundreds of taps are required if a finite impulse response (FIR) filter is employed to compensate the effects of CD. To save computation, such a long FIR filter is often implemented in frequency domain by means of FFT/IFFT with overlap-and-add, as discussed for example in Rabiner, Lawrence R.; Gold, Bernard (1975) Theory and application of digital signal processing. Englewood Cliffs, N.J.: Prentice-Hall, which is hereby incorporated by reference herein. The dispersion parameter of a fiber varies slowly with environment such as temperature and moisture level.

PMD is caused by velocity difference between polarizations of traveling light. The resulting pulse spread, called differential group delay (DGD) is a few to a few tens of picoseconds for a typical fiber of length of a few thousand kilometers. For dual polarization (DP) signaling, PMD also causes multiplexing of the signals transmitted at two polarizations. Due to the random-walk nature of PMD effects, the multiplexing matrix is constantly rotating. The speed of the rotation can be up to several tens of thousands of radians per second. The fast time-varying nature of PMD requires a fast adaptive filter at the receiver. In a parallel implementation, which is often the case of high-speed communication systems, the block size must be kept small so that the multiplexing matrix is almost constant during a PMD filtering block. In addition to PMD, the signals of different polarizations may arrive at the receiver with different amplitude, leading to so-called PDL.

The demand of higher communication speed has spurred the recent research and development of DP coherent optical communication systems. In coherent reception of DP optical signals, the standard approach to channel equalization and polarization de-multiplexing employs two digital signal processing (DSP) components: a fixed equalizer and an adaptive equalizer comprising a multiple-input multiple-output (MIMO) filter. The fixed equalizer compensates the bulk of relatively static chromatic dispersion (CD) and is often implemented in frequency-domain for long-haul channels. The adaptive equalizer compensates polarization-mode dispersion (PMD), polarization-dependent loss (PDL), de-multiplexes the two polarization signals, and equalizes other channel impairments such as non-ideal filtering effects and any residual CD.

Examples of prior art equalization for coherent DP multiplexed optical signals are disclosed in the following publications, incorporated by reference herein in their entirety:

"Digital Filters for Coherent Optical receivers", Optics Express, Vol. 16, Issue 2, pp. 804-817 (2008), by Seb J. Savory; ("Savory"); and "Adaptive Crossing Frequency Domain Equalization (FDE) in Digital PolMux Coherent Systems", US patent application publication, US 2010/0142952 A1, by Dayou Qian and Ting Wang. ("Qian")

Figure 1:
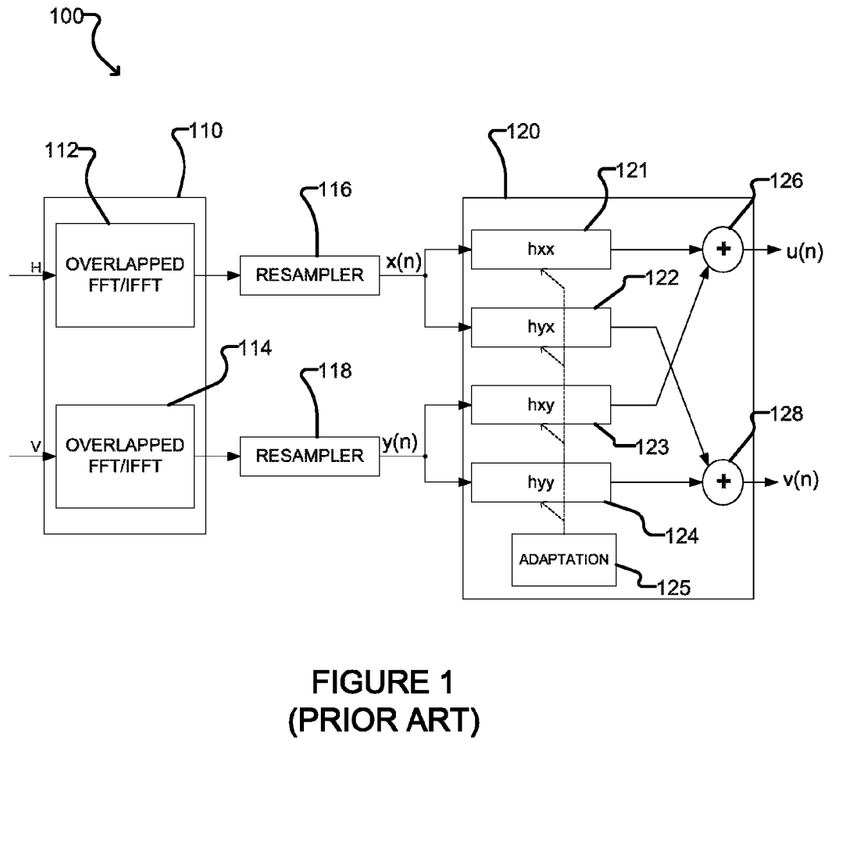
FIG. 1 schematically illustrates an example two-stage equalization system according to the prior art.

FIG. 1 shows an example prior art two-stage hybrid frequency and time domain equalization system 100, similar to the system discussed by Savory. Such systems are currently widely used for real-time coherent optical systems. System 100 comprises a fixed frequency domain equalization (FDE) stage 110 followed by an adaptive time domain equalization stage comprising an adaptive multiple input multiple output (MIMO) filter 120. A pair of dual polarization signals H and V are received by overlapped fast Fourier transform (FFT) and inverse fast Fourier transform (IFFT) blocks 112 and 114, which compensate for CD as known in the art. The outputs of FFT/IFFT blocks 112 and 114 are resampled by resamplers 116 and 118, then passed to four MIMO filter branches 121-124 to compensate for PMD. The resampled signal from one polarization is passed to branches 121 and 122, and the resampled signal from the other polarization is passed to branches 123 and 124. The outputs of branches 121 and 123 are summed by adder 126, and the outputs of branches 122 and 124 are summed by adder 128, to produce output signals u(n) and v(n), respectively. With this structure, the latency of PMD compensator is only limited by the processing speed. Consequently, the timing information can be conveniently extracted at the output of PMD compensator (i.e. at the outputs of adders 126 and 128), and retiming is achieved by means of resamplers 116 and 118. The relatively small MIMO filter size also ensures negligible performance loss due to PMD rotation.

Figure 2:
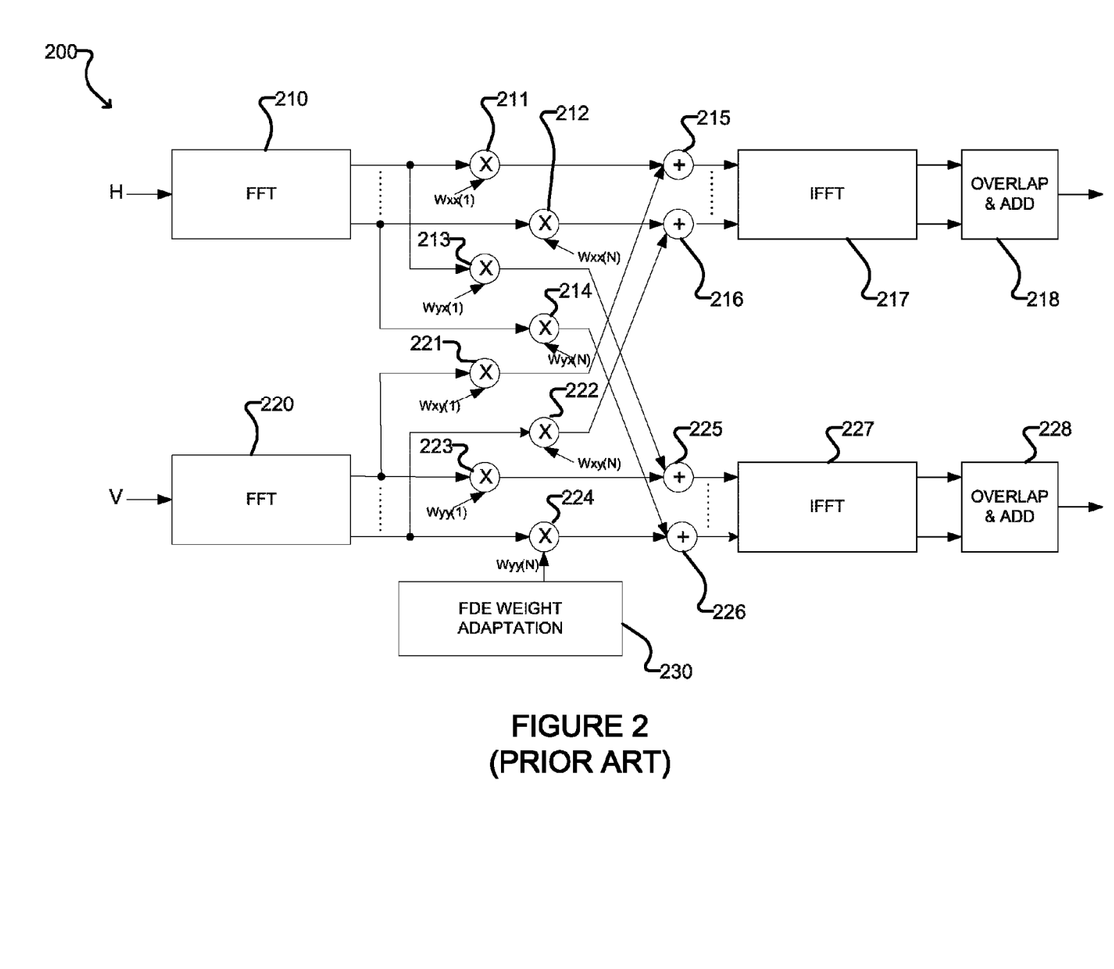
FIG. 2 schematically illustrates an example single-stage equalization system according to the prior art.

FIG. 2 shows an example prior art single stage adaptive frequency-domain equalization system 200, similar to the system disclosed by Qian. System 200 comprises FFT blocks 210 and 220 which receive dual polarization signals H and V, respectively. FFT block 210 transforms signal H into N frequency components, each of which components are passed to a pair of multipliers (schematically illustrated as multipliers 211-214 in FIG. 2, wherein the first frequency component is passed to multipliers 211 and 213 and the Nth frequency components is passed to multipliers 212 and 214). Likewise, FFT block 220 transforms signal V into N frequency components which are passed to multipliers 221-224. Each of multipliers 211-214 and 221-224 multiplies the received frequency component by a corresponding weighting coefficient ($W_{xx(1-N)}$, $W_{xy(1-N)}$, $W_{yx(1-N)}$, $W_{yy(1-N)}$) received from FDE weight adaptation block 230. Each weighted frequency component is then summed with the corresponding weighted frequency component from the signal of the other polarization by adders 215, 216, 225, 226, before being transformed back to the time domain by IFFT blocks 217 and 227. The outputs of IFFT blocks 217 and 227 are then processed by overlap and add blocks 218 and 228, respectively.

System 200 resembles the first stage of the standard two-stage structure, i.e., the CD compensator. The difference is that the frequency-domain filter now has four sets of coefficients all of which need to be adapted. For large FFT size, these are a large number of filter taps to be adapted. This structure may lead to lower complexity but not suitable for optical links with large CD and fast PMD rotation, because the multiplexing matrix may change significantly during the processing of a large FFT/IFFT block. In addition, time tracking may not be able to take advantage of equalized data due to the large latency of the CD compensator.

The PMD MIMO filter is often by far the largest component in a digital coherent receiver for long-haul optical systems. Some PMD MIMO filters account for up to 50% or more of the total DSP gate counts in a typical ASIC design. The inventors have identified a need for improved methods and systems for reducing the complexity and power consumption required by PMD compensation in DP coherent optical transceivers.

SUMMARY

One aspect provides a method for processing a pair of random polarization electrical signals derived from coherent dual polarization optical signals received over an optical link. The method comprises receiving a first input signal having a first polarization and a second input signal having a second polarization; filtering the first input signal by a first complex SISO FIR filter and the second input signal by a second complex SISO FIR filter to generate a first filtered input signal and a second filtered input signal; filtering the first and second filtered input signals by a first two-by-two matrix filter having four branches, wherein first and second branches receive the first filtered input signal, third and fourth branches receive the second filtered input signal, outputs of the first and third branches are summed to generate a first equalized filtered signal and outputs of the second and fourth branches are summed to generate a second equalized filtered signal; filtering the first and second input signals by a second two-by-two matrix filter having four branches, wherein first and second branches receive the first input signal, third and fourth branches receive the second input signal, outputs of the first and third branches are summed to generate a first equalized signal and outputs of the second and fourth branches are summed to generate a second equalized signal; and, adapting the first and second complex SISO FIR filters based on the first and second equalized signals and the first and second equalized filtered signals. The first two-by-two matrix filter may be adapted based on the first and second filtered input signals and the first and second equalized filtered signals, for example by determining adjusted coefficients for the branches of the first two-by-two matrix filter and applying the adjusted coefficients to the branches of the first two-by-two matrix filter at a first rate. The adjusted coefficients may be copied to the branches of the second two-by-two matrix filter at a second rate slower than the first rate. The pair of random polarization electrical signals may be derived from the coherent dual polarization optical signals by frequency domain equalization to compensate for chromatic dispersion prior to filtering by the first and second complex SISO FIR filters. The first and second complex SISO FIR filters may be substantially identical.

Another aspect provides a method for processing dual polarization optical signals received over an optical link, comprising filtering two random polarization input signals in a frequency-domain by overlapped fast Fourier transform and inverse fast Fourier transform (FFT/IFFT) blocks to generate first and second partially equalized signals; delaying the partially equalized signals to generate first and second delayed partially equalized signals; filtering the delayed partially equalized signals by a two-by-two matrix filter having four branches, wherein first and second branches receive the first delayed partially equalized signal, third and fourth branches receive the second delayed partially equalized signal, outputs of the first and third branches are summed to generate a first equalized signal and outputs of the second and fourth branches are summed to generate a second equalized signal; and, adapting the filtering applied by the FFT/IFFT blocks based on the first and second equalized signals. The partially equalized signals may be delayed by a number of samples equal to half of a length of the branches of the two-by-two matrix filter. A delay update may be determined based on the first and second equalized signals and an adaptation step-size utilized for adapting the filtering applied by the FFT/IFFT blocks. The filtering applied by the FFT/IFFT blocks may be adapted by determining frequency domain adjustments based on the first and second equalized signals, merging the frequency domain adjustments with fixed chromatic dispersion compensation coefficients to generate adjusted coefficients, and applying the adjusted coefficients to the FFT/IFFT blocks. The two-by-two matrix filter may be adapted based on the first and second delayed partially equalized signals and the first and second equalized signals.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides methods and systems for equalizing dual polarization (DP) signals. Such methods and systems find direct applications in coherent DP optical communication systems, and can be implemented by software, or by hardware such as FPGAs and ASICs, or by a combination software and hardware. Such methods and systems can also be applied to communication systems where filtering processes are required to compensate impairments that are of different varying speed and certain a priori knowledge is available regarding the slowly varying impairments.

Problem Statement

The different natures of CD and PMD impairments call for a two-stage DSP equalization architecture of the type depicted in FIG. 1. In a typical implementation for long-haul optical links, the length of the FFT/IFFT transformation in the frequency-domain CD compensator, (blocks 112 and 114 in FIG. 1), is up to a few hundreds to a couple of thousands samples depending on the fiber length, fiber dispersion parameter, and the data rate. The frequency-domain coefficients are typically multiplied with the outputs of FFT before IFFT and fixed during communications. The frequency-domain coefficients may, for example, be determined by a priori knowledge of the optical link, or determined upon link startup using methods known in the art (such as, for example, a "brute force" sweep through fixed settings). Two identical CD compensators including the multiplication coefficients are independently applied to the two input polarization signals.

The PMD compensator, shown as the adaptive MIMO filter 120 in FIG. 1, has a much smaller length than the CD compensators. The length of the PMD filter is determined by the following factors:
  the amount of residual CD due to any mismatch of preloaded CD compensator coefficients and desired ones,
  the non-ideal nature of electronic and optical filters,
  the duration of DGD, and
  the sampling rate of the signal.

For a typical state-of-the-art long-haul optic link, the PMD compensator requires twelve or more of taps per branch of the filter. Since the MIMO filter 120 has 4 branches, {hxx, hxy, hyx, hyy}, a total of 50 or more complex multiplications are required to process a data sample. As discussed above, this is by far the most complex and power-consuming process of a receiver DSP.

Technical Solutions and Example Embodiments

Systems and methods disclosed herein provide similar advantages to a standard two-stage equalization structure but with much reduced complexity. The reduction in complexity is made possible by making use of the different characteristics of the target channel impairments of the second-stage adaptive filter and a scheme specifically devised to adapt the filter coefficients of the first stage filter requiring only the outputs of the second-stage filter.

In the standard two-stage equalization, the adaptive PMD aims at compensating for two types of impairments:
  Relatively static channel impairments. These include residual CD due to measurement error, slow variation with temperature and moisture level, and non-ideal electronic and optical filters in the transceiver chain. They don't require fast adaptation and are common to both polarizations. Their satisfactory compensation/equalization typically requires about 10 to 13 taps when sampling rate at twice of the baud rate.
  Fast time-varying impairments. These include PMD and PDL. They require fast adaptation to track the PMD rotation that is typically a few tens of thousands of radians per second. Their compensation typically needs less than 10 filter taps for data rate 200 Gbps or less.

The four branches 121-124 of the MIMO filter 120 in FIG. 1 have some common targets, such as any residual CD and non-ideal optic and electrical filtering. These common targets may be extracted from the MIMO filter to reduce the complexity and cost of PMD filtering, as illustrated by the example system 300 shown in FIG. 3. The system 300 of FIG. 3 may, for example, be used in place of the MIMO filter 120 in FIG. 1 (which is reproduced at the top of FIG. 3 for ease of reference). It is clear from filtering theory that a MIMO filter 120 equivalent to system 300 has four branches, each having $L_1+L_2-1$ taps.

Figure 3:
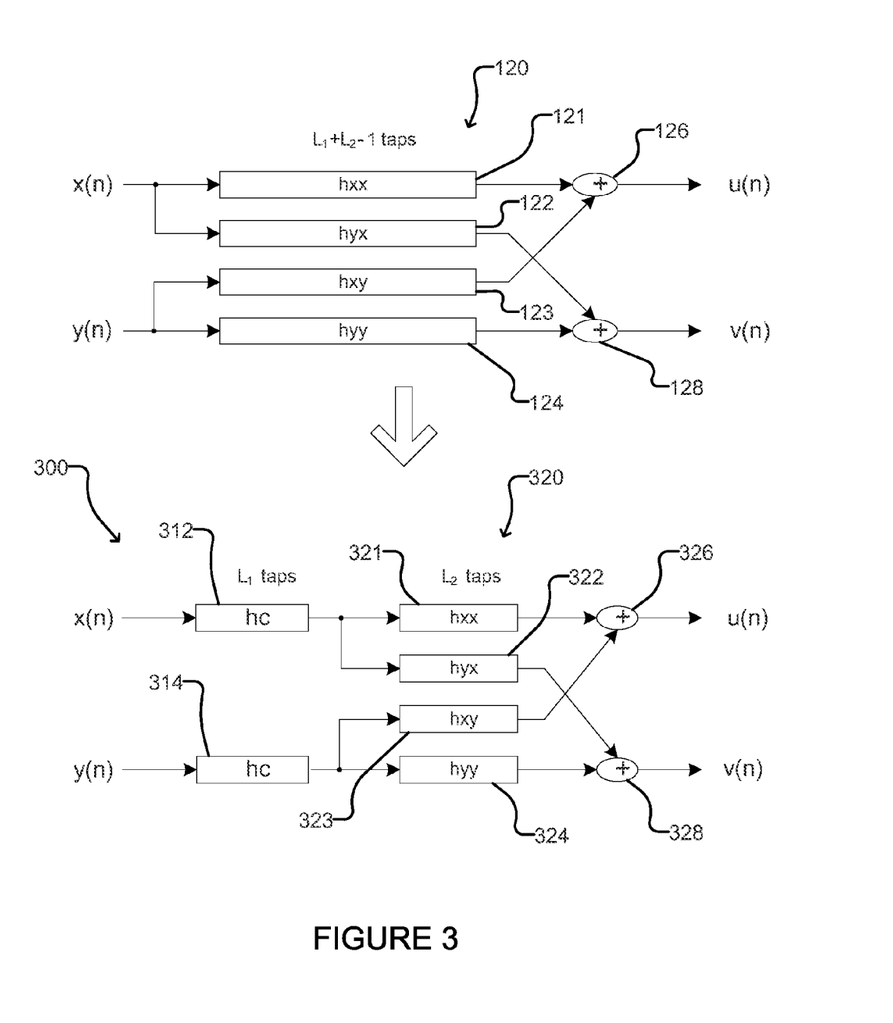
FIG. 3 schematically illustrates an example reduced-complexity PMD compensation system according to one embodiment.

As shown in FIG. 3, the system 300 comprises two complex single-input and single-output (SISO) filters 312 and 314 having $L_1$ taps, each of which applies the same filtering ($h_c$) to the input dual polarization signals x(n) and y(n) (which may, for example, be the CD-compensated outputs of resamplers such as the resamplers 116 and 118 of FIG. 1). The SISO filters 312 and 314 are followed by a MIMO filter 320 with 4 branches, individually labeled 321, 322, 323 and 324, each having $L_2$ taps. The total number of multiplications required for PMD compensation is thus reduced from $4(L_1+L_2-1)$ (in the case of MIMO filter 120 of FIG. 1) to $2 L_1+4 L_2$ (in the case of system 300 of FIG. 3). The outputs of branches 321 and 323 are summed by adder 326 to generate a first output signal u(n), and the outputs of branches 322 and 324 are summed by adder 328 to generate a second output signal v(n).

Widely used least-mean square (LMS) and constant modulus algorithm (CMA), as described for example in Simon Haykin, *Adaptive Filter Theory*, Prentice-Hall, 2001, which is hereby incorporated by reference herein, can be directly used to adapt the MIMO filter 320 based on its inputs and outputs. For the adaptation of the SISO filters 312 and 314, a direct application of LMS or CMA requires the outputs of a MIMO filter like filter 320 in the absence of the SISO filters 312 and 314. An example of such an implementation is discussed below with reference to FIG. 4. Alternatively, the functionality of the SISO filters may be incorporated into first stage frequency-domain CD filters, as described below with reference to FIG. 5.

Figure 4:
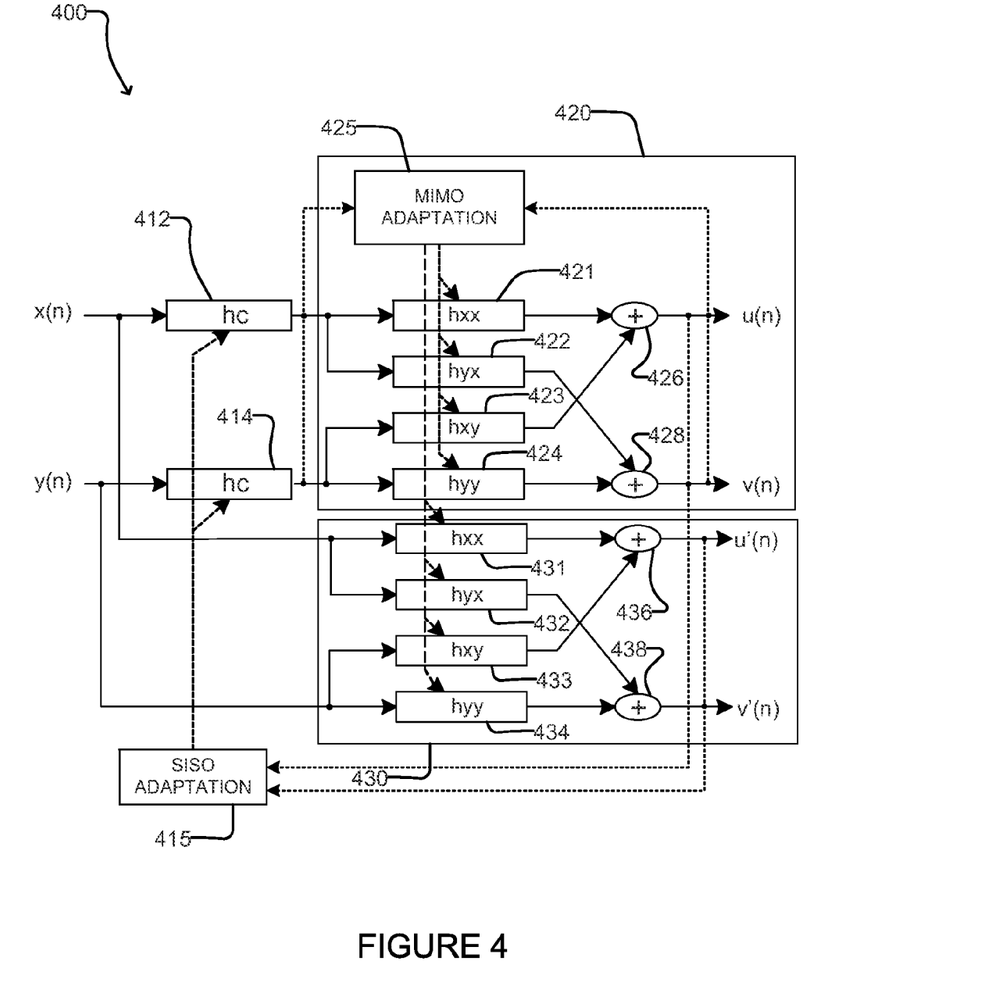
FIG. 4 schematically illustrates an example reduced-complexity PMD compensation system according to another embodiment.

FIG. 4 shows another example system 400 for processing two random polarization input signals x(n) and y(n) similar to system 300 of FIG. 3 wherein the outputs of the MIMO filter are used to adapt the SISO filters by applying LMS or CMA techniques. Elements 412, 414, 421, 422, 423, 424, 426 and 428 of the system 400 are substantially the same as elements 312, 314, 321, 322, 323, 324, 326 and 328 of the system 300. The system 400 of FIG. 4 also comprises a MIMO adaptation block 425 which adjusts filter branches 421-424 based on the outputs of SISO filters 412 and 414 and adders 426 and 428. The system 400 of FIG. 4 also comprises an additional MIMO filter 430 which is used to provide feedback to a SISO adaptation block 415 for adjusting the SISO filters 412 and 414. In particular, the unfiltered random polarization input signals x(n) and y(n) are provided to filter branches 431-434, and SISO adaptation block 415 adjusts SISO filters 412 and 414 based on the outputs of adders 426 and 428 (u(n) and (v(n)) and the outputs of adders 436 and 438 (u'(n) and v'(n)). Since the filtering, $h_c$, applied by SISO filters 412 and 414 is aimed at channel impairments that are relatively static during a communication session, the additional MIMO filter 430 in FIG. 4 needs only to work at a slower speed than the MIMO filter 420, and can be stopped after the convergence of $h_c$. For example, in some embodiments the MIMO adaptation block 425 determines adjusted coefficients for the branches 421-424 of the first MIMO filter 420 and applies the adjusted coefficients to the first MIMO filter 420 at first rate. The first rate may, for example, be on the order of 1 GHz in some embodiments. The MIMO adaptation block 425 may copy the adjusted coefficients to the branches 431-434 of the additional MIMO filter 430 at a second rate which is slower than the first rate. For example, in some embodiments the MIMO adaptation block 425 may copy the adjusted coefficients to the branches 431-434 of the additional MIMO filter 430 periodically, or as needed whenever the output of the additional MIMO filter 430 is computed for use by the SISO adaptation block 415. Hence the complexity and implementation cost of the additional MIMO filter 430 can be substantially lower than those of the MIMO filter 420.

Adding a delay of d samples right after the $L_1$-tap filter, $h_c$, in a system such as system 300 of FIG. 3 or system 400 of FIG. 4 only delays the outputs of the system by d samples. The delay may be implemented as a filter of length $L_1$ whose first d coefficients are 0's followed by a 1 and another $(L_1-d-1)$ 0's, i.e., $$h_d=[0,\ldots,0,1,0,\ldots,0] \quad \text{Equation 1}$$

At any time, adding an update, $\Delta h_d$, to the filter $h_d$ is equivalent to convolving the updated $h_d$ with $h_c$, i.e., $$h_c \leftarrow \text{conv}(h_c, \Delta h_d + h_d) \quad \text{Equation 2}$$

Figure 5:
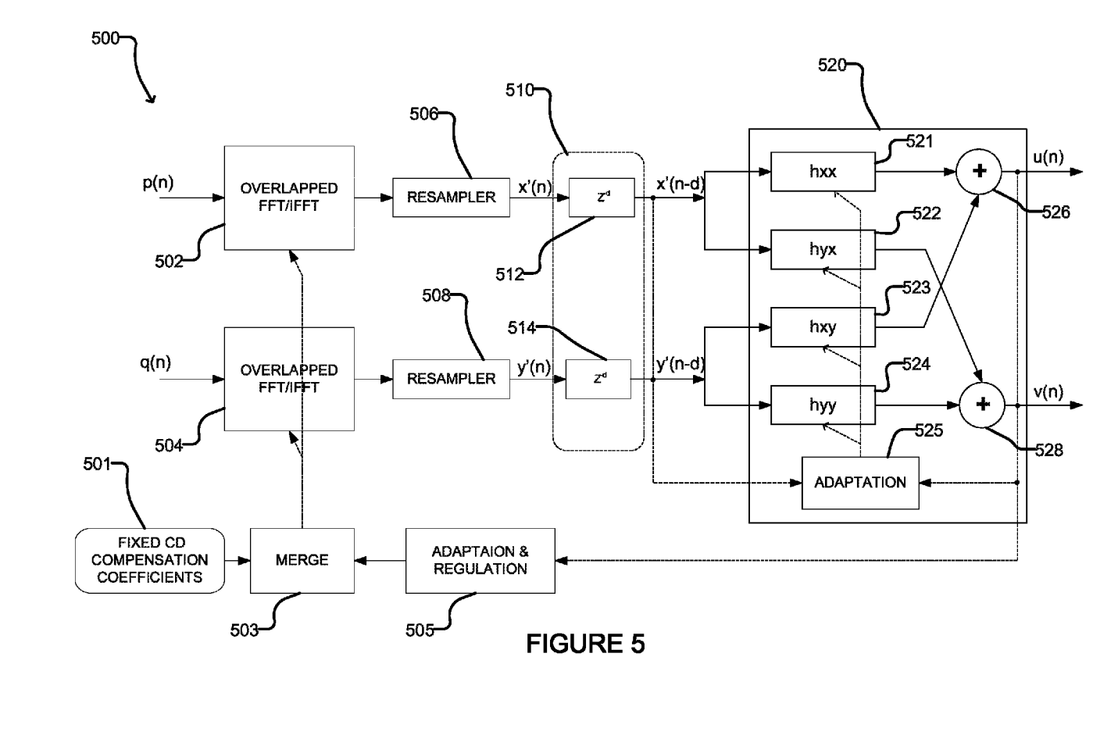
FIG. 5 schematically illustrates an example two-stage equalization system according to another embodiment.

The filtering, $h_c$, applied by SISO filters 312/412 and 314/414 in the examples discussed above can be merged into a first-stage CD compensator of a two-stage equalization system, and updates to $h_c$ can be calculated by introducing a delay filter at its original location in FIGS. 3 and 4. If $h_c$ in FIG. 4 is a simple delay filter $h_d$, u(n) and v(n) are just delayed versions of u'(n) and v'(n). Consequently, when filtering equivalent to $h_c$ is incorporated into the first-stage CD compensator, the additional MIMO filter 430 in FIG. 4 used solely for the adaptation of $h_c$ is no longer needed. As an example, the update $\Delta h_d$ can be calculated by using CMA algorithm as $$\Delta h_d(k) = \mu[e_u(n)u^*(n-k+d) + e_v(n)v^*(n-k+d)], k=1,\ldots,L_1$$

$$e_u(n) = (1-|u(n)|)^2 u(n),$$

$$e_v(n) = (1-|v(n)|)^2 v(n) \quad \text{Equation 3}$$

where $u^*(n)$ is the complex conjugate of u(n) and $\mu$ is the step-size of the adaptation applied by the adaptation block used to adapt the first-stage CD compensator (e.g., block 505 in FIG. 5, discussed below). For simplicity, the above equation assumes baud-rate sampling and can be readily extended to other sampling rates.

FIG. 5 shows an example two-stage equalization system 500 wherein functionality of the SISO filter $h_c$ is merged to a first-stage CD compensator. The system 500 comprises overlapped FFT/IFFT blocks 502 and 504 which receive input signals p(n) and q(n), respectively. The outputs of blocks 502 and 504 are respectively resampled by resamplers 506 and 508 to generate CD compensated signals x(n) and y(n). Signals x(n) and y(n) are passed through a delay block 510 comprising delay filters 512 and 514 which apply a delay of $z^d$ (which is conceptually equivalent to a filter of L1 taps) to generate delayed signals x(n-d) and y(n-d), which are provided to filter branches 521-524 of a MIMO filter 520. In some embodiments, the delay of $z^d$ has a length of half the length of the branches 521-524 of the MIMO filter 520. The outputs of adders 526 and 528 are equalized signals u(n) and v(n), which are monitored, along with signals x(n-d) and y(n-d) by an adaptation block 525 to adjust the filtering applied by filter branches 521-524. The equalized signals u(n) and v(n) are also monitored by an adaptation and regulation block 505 to adaptively determine $h_c$ for adjusting the first stage CD compensator. The adjustments determined by block 505 are merged at block 503 with fixed CD compensation coefficients 501 and applied to blocks 502 and 504.

To prevent $h_c$ from growing length as a result of convolution in Eq. 2, only the L center taps of the result of Eq. 2 are kept before they are added to the CD compensator, where L can be chosen slightly larger than L1 for higher accuracy. Supposing at a given time $h_c$ is updated as the center L taps of the result of Eq. 2, the new CD compensator frequency-domain coefficient vector is calculated as the element-wise product of a pre-loaded CD compensator coefficient vector $w_{preload}$ and the FFT of $h_c$ $$w_{cd} = w_{preload} \times FFT(h_c) \quad \text{Equation 4}$$

In the system 500 of FIG. 5, adaptation of $h_c$ and the CD compensator can be made once every one or a few FFT blocks. Thanks to the fact that $h_c$ is aimed at relatively static channel impairments, this adaptation rate is sufficient. The computational complexity of the CD compensator implemented by blocks 502 and 504 is also much smaller than that of the adaptive MIMO filter. Hence, the reduction in complexity of this embodiment with respect to the standard approach is determined by the number of MIMO filter taps saved. In a typical implementation for 40 Gbps long-haul optical links, about 60% of the PMD computation cost can be saved.

The system 500 of FIG. 5 differs from the standard structure shown in FIG. 1 in a number of ways, including:

The time-domain MIMO filter branches 521-524 in the new structure are much shorter than that in the standard structure.

The CD compensator in the new structure is adaptive while the CD compensator in the standard structure is fixed.

A delay is added between the re-sampler and the MIMO filter in the new structure.

The adaptive CD compensation implemented by blocks 502 and 504 in the system 500 of FIG. 5 differs from the one-stage solution of FIG. 2 in a number of ways, including:

The new adaptive CD compensator implemented by blocks 502 and 504 does not try to compensate PMD. Blocks 502 and 504 compensate for CD and any other detected impairments that are common to the two polarizations. In some embodiments, blocks 502 and 504 are independent and identical frequency-domain filters.

The new adaptive CD compensator implemented by blocks 502 and 504 has only one set of coefficients, (i.e., the fixed coefficients 501 merged at 503 with the adjustments determined at block 505) instead of four set of coefficients in the case of the FIG. 2 example (i.e., Wxx(1...N), Wyx(1...N), Wxy(1...N) and Wyy(1...N)).

The new adaptive CD compensator can be adapted at a slower speed (as compared to the adaptation for PMD compensation) without degraded performance for a channel with fast PMD rotation.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the invention may be implemented using specifically designed hardware, configurable hardware, programmable data processors configured by the provision of software (which may optionally comprise 'firmware') capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs") and the like. Examples of configurable hardware are: one or more programmable logic devices such as programmable array logic ("PALs"), programmable logic arrays ("PLAs") and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device (such as, for example a node of a communications network) may implement methods as described herein by executing software instructions in a program memory accessible to the processors.

While processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, while elements are at times shown as being performed sequentially, they may instead be performed simultaneously or in different sequences. It is therefore intended that the following claims are interpreted to include all such variations as are within their intended scope.

Embodiments of the disclosure can be represented as a computer program product stored in a machine-readable medium (also referred to as a computer-readable medium, a processor-readable medium, or a computer usable medium having a computer-readable program code embodied therein). Program products according to the invention may be in any of a wide variety of forms. The machine-readable medium can be any suitable tangible, non-transitory medium, including magnetic, optical, or electrical storage medium including a diskette, compact disk read only memory (CD-ROM), memory device (volatile or non-volatile), hardwired or preprogrammed chips (e.g., EEPROM semiconductor chips), nanotechnology memory, or similar storage mechanism. The machine-readable medium can contain various sets of instructions, code sequences, configuration information, or other data, which, when executed, cause a processor to perform steps in a method according to an embodiment of the disclosure. The information on the machine-readable medium may optionally be compressed or encrypted. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions and permutations are possible within the practice of this invention. This invention includes variations on described embodiments that would be apparent to one skilled in the art, including variations obtained by: replacing features, elements and/or steps with equivalent features, elements and/or steps; mixing and matching of features, elements and/or steps from different embodiments; combining features, elements and/or steps from embodiments as described herein with features, elements and/or steps of other technology; and/or omitting features, elements and/or steps from described example embodiments.

It is therefore intended that the following appended claims and claims hereafter introduced are interpreted to include all such modifications, permutations, additions, omissions and sub-combinations as may reasonably be inferred. The scope of the claims should not be limited by the preferred embodiments set forth in the examples, but should be given the broadest interpretation consistent with the description as a whole. The above-described embodiments are intended to be examples only. Alterations, modifications and variations can be effected to the particular embodiments by those of skill in the art without departing from the scope, which is defined solely by the claims appended hereto.

What is claimed is:

1. A method for processing a pair of random polarization electrical signals derived from coherent dual polarization optical signals received over an optical link, the method comprising:
    receiving a first input signal having a first polarization and a second input signal having a second polarization;
    filtering the first input signal by a first complex SISO FIR filter and the second input signal by a second complex SISO FIR filter to generate a first filtered input signal and a second filtered input signal;
    filtering the first and second filtered input signals by a first two-by-two matrix filter having four branches, wherein first and second branches receive the first filtered input signal, third and fourth branches receive the second filtered input signal, outputs of the first and third branches are summed to generate a first equalized filtered signal and outputs of the second and fourth branches are summed to generate a second equalized filtered signal;
    filtering the first and second input signals by a second two-by-two matrix filter having four branches, wherein first and second branches receive the first input signal, third and fourth branches receive the second input signal, outputs of the first and third branches are summed to generate a first equalized signal and outputs of the second and fourth branches are summed to generate a second equalized signal; and,
    adapting the first and second complex SISO FIR filters based on the first and second equalized signals and the first and second equalized filtered signals.

2. The method of claim 1, comprising adapting the first two-by-two matrix filter based on the first and second filtered input signals and the first and second equalized filtered signals.

3. The method of claim 2, wherein adapting the first two-by-two matrix filter comprises determining adjusted coefficients for the branches of the first two-by-two matrix filter and applying the adjusted coefficients to the branches of the first two-by-two matrix filter at a first rate.

4. The method of claim 3, comprising copying the adjusted coefficients to the branches of the second two-by-two matrix filter at a second rate slower than the first rate.

5. The method of claim 1, wherein the pair of random polarization electrical signals are derived from the coherent dual polarization optical signals by frequency domain equalization to compensate for chromatic dispersion prior to filtering by the first and second complex SISO FIR filters.

6. The method of claim 1, wherein the first and second complex SISO FIR filters are substantially identical.

7. A system for processing a pair of random polarization electrical signals derived from coherent dual polarization optical signals received over an optical link, the system comprising:
an input for receiving a first input signal having a first polarization and a second input signal having a second polarization;
a first complex SISO FIR filter for filtering the first input signal and a second complex SISO FIR filter for filtering the second input signal to generate a first filtered input signal and a second filtered input signal;
a first two-by-two matrix filter having four branches for filtering the first and second filtered input signals, wherein first and second branches receive the first filtered input signal, third and fourth branches receive the second filtered input signal, outputs of the first and third branches are summed to generate a first equalized filtered signal and outputs of the second and fourth branches are summed to generate a second equalized filtered signal;
a second two-by-two matrix filter having four branches for filtering the first and second input signals, wherein first and second branches receive the first input signal, third and fourth branches receive the second input signal, outputs of the first and third branches are summed to generate a first equalized signal and outputs of the second and fourth branches are summed to generate a second equalized signal; and,
an adaptation block for adapting the first and second complex SISO FIR filters based on the first and second equalized signals and the first and second equalized filtered signals.

8. The system of claim 7, wherein the adaptation block is configured to adapt the first two-by-two matrix filter based on the first and second filtered input signals and the first and second equalized filtered signals.

9. The system of claim 8, wherein the adaptation block is configured to adapt the first two-by-two matrix filter by determining adjusted coefficients for the branches of the first two-by-two matrix filter and applying the adjusted coefficients to the branches of the first two-by-two matrix filter at a first rate.

10. The system of claim 9, wherein the adaptation block is configured to copy the adjusted coefficients to the branches of the second two-by-two matrix filter at a second rate slower than the first rate.

11. The system of claim 7, comprising a frequency domain equalization stage for compensating for chromatic dispersion prior to filtering by the first and second complex SISO FIR filters.

12. The system of claim 7, wherein the first and second complex SISO FIR filters are substantially identical.

13. A method for processing dual polarization optical signals received over an optical link, the method comprising:
filtering two random polarization input signals in a frequency-domain by overlapped fast Fourier transform and inverse fast Fourier transform (FFT/IFFT) blocks to generate first and second partially equalized signals;
delaying the partially equalized signals to generate first and second delayed partially equalized signals;
filtering the delayed partially equalized signals by a two-by-two matrix filter having four branches, wherein first and second branches receive the first delayed partially equalized signal, third and fourth branches receive the second delayed partially equalized signal, outputs of the first and third branches are summed to generate a first equalized signal and outputs of the second and fourth branches are summed to generate a second equalized signal; and,
adapting the filtering applied by the FFT/IFFT blocks based on the first and second equalized signals.

14. The method of claim 13, wherein delaying the partially equalized signals comprises delaying by a number of samples equal to half of a length of the branches of the two-by-two matrix filter.

15. The method of claim 13, comprising periodically determining a delay update $\Delta h_d$ according to:

$$\Delta h_d(k) = \mu[e_u(n)u^*(n-k+d) + e_v(n)v^*(n-k+d)], k = 1, \ldots, L_1$$

$$e_u(n) = (1 - |u(n)|)^2 u(n),$$

$$e_v(n) = (1 - |v(n)|)^2 v(n)$$

where u(n) and v(n) are the first and second equalized signals, respectively, u*(n) and v*(n) are the complex conjugates of u(n) and v(n), respectively, and p is an adaptation step-size utilized for adapting the filtering applied by the FFT/IFFT blocks.

16. The method of claim 13, wherein adapting the filtering applied by the FFT-IFFT blocks comprises determining frequency domain adjustments based on the first and second equalized signals, merging the frequency domain adjustments with fixed chromatic dispersion compensation coefficients to generate adjusted coefficients, and applying the adjusted coefficients to the FFT/IFFT blocks.

17. The method of claim 13, comprising adapting the two-by-two matrix filter based on the first and second delayed partially equalized signals and the first and second equalized signals.

18. A system for processing dual polarization optical signals received over an optical link, the system comprising:
a pair of overlapped fast Fourier transform and inverse fast Fourier transform (FFT/IFFT) blocks for filtering two random polarization input signals in a frequency-domain to generate first and second partially equalized signals;
a delay filter for delaying the partially equalized signals to generate first and second delayed partially equalized signals;
a two-by-two matrix filter having four branches for filtering the delayed partially equalized signals, wherein first and second branches receive the first delayed partially equalized signal, third and fourth branches receive the second delayed partially equalized signal, outputs of the first and third branches are summed to generate a first equalized signal and outputs of the second and fourth branches are summed to generate a second equalized signal; and,
a frequency-domain adaptation subsystem for adapting the filtering applied by the FFT/IFFT blocks based on the first and second equalized signals.

19. The system of claim 18, wherein the delay filter is configured to delay the partially equalized signals comprises by a number of samples equal to half of a length of the branches of the two-by-two matrix filter.

20. The system of claim 18, wherein the adaptation subsystem is configured to periodically determine a delay update $\Delta h_d$ according to:

$$\Delta h_d(k) = \mu[e_u(n)u^*(n-k+d) + e_v(n)v^*(n-k+d)], k = 1,\ldots,L_1$$

$$e_u(n) = (1-|u(n)|)^2 u(n),$$

$$e_v(n) = (1-|v(n)|)^2 v(n)$$

where u(n) and v(n) are the first and second equalized signals, respectively, u*(n) and v*(n) are the complex conjugates of u(n) and v(n), respectively, and μ is an adaptation step-size utilized for adapting the filtering applied by the FFT/IFFT blocks.

21. The system of claim 18, wherein the adaptation subsystem is configured to determine frequency domain adjustments based on the first and second equalized signals, merge the frequency domain adjustments with fixed chromatic dispersion compensation coefficients to generate adjusted coefficients, and apply the adjusted coefficients to the FFT/IFFT blocks.

22. The system of claim 18, comprising a time-domain adaptation subsystem for adapting the two-by-two matrix filter based on the first and second delayed partially equalized signals and the first and second equalized signals.

* * * * *

UNITED STATES PATENT AND TRADEMARK OFFICE
CERTIFICATE OF CORRECTION

| | | |
|---|---|---|
| PATENT NO. | : 8,923,460 B1 | Page 1 of 1 |
| APPLICATION NO. | : 13/767092 | |
| DATED | : December 30, 2014 | |
| INVENTOR(S) | : Xiaofeng Wang et al. | |

It is certified that error appears in the above-identified patent and that said Letters Patent is hereby corrected as shown below:

In the Claims

Column 12, line 26, claim 15, delete "p" and insert therefor -- µ --

Signed and Sealed this
Twenty-eighth Day of April, 2015

Michelle K. Lee
*Director of the United States Patent and Trademark Office*